Feb. 13, 1940. J. E. TUSCHER 2,190,051
FUEL INJECTION
Filed March 25, 1936 3 Sheets-Sheet 1

INVENTOR
Jean E. Tuscher
BY
Pennie Davis Marvin + Edmonds
ATTORNEYS

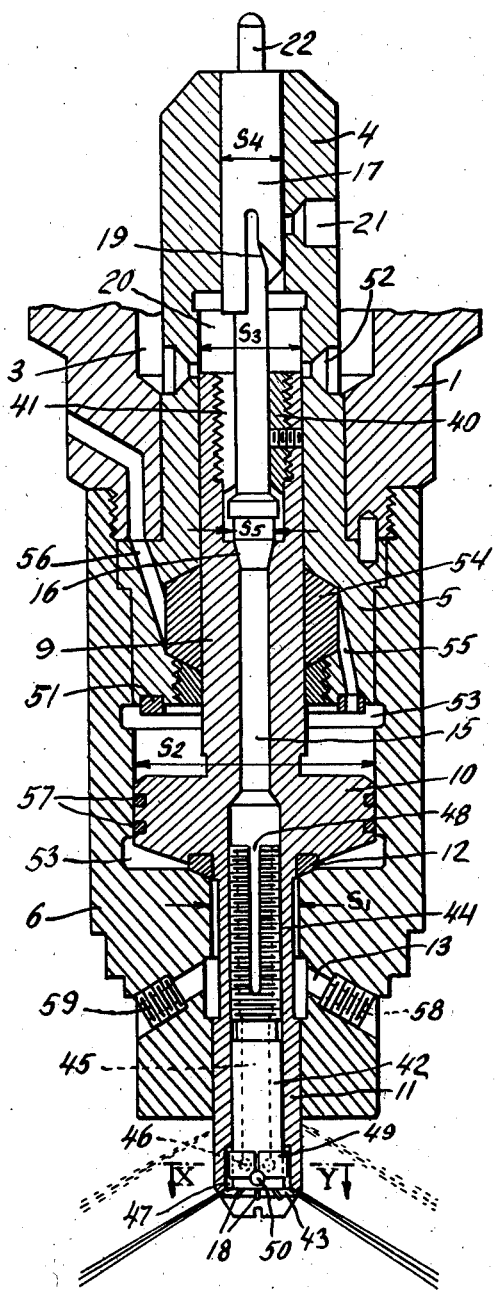

Feb. 13, 1940.　　　J. E. TUSCHER　　　2,190,051
FUEL INJECTION
Filed March 25, 1936　　　3 Sheets-Sheet 3
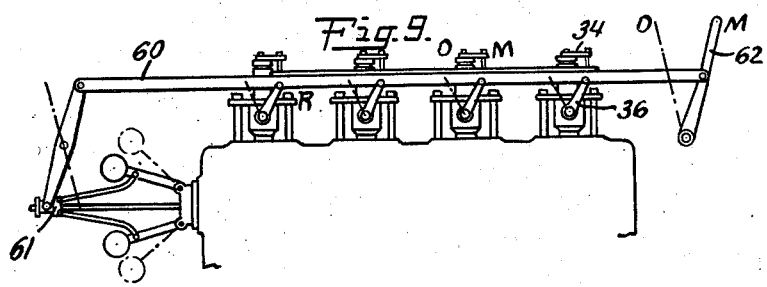
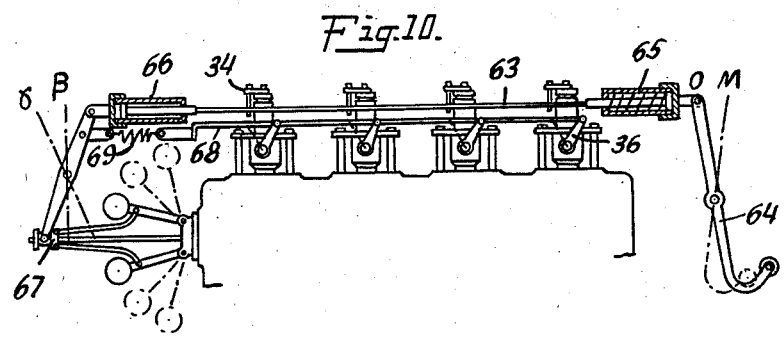
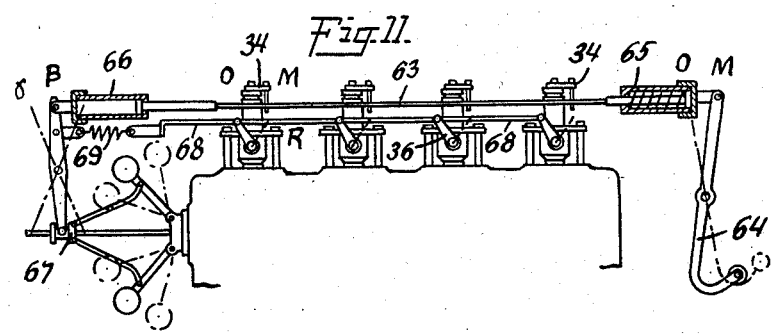
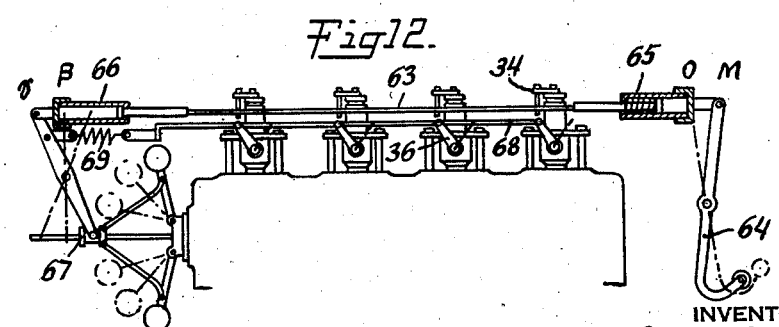
INVENTOR
Jean E. Tuscher
BY
Pennie Davis Marvin & Edmonds
ATTORNEYS

UNITED STATES PATENT OFFICE 2,190,051

FUEL INJECTION

Jean Edouard Tuscher, Petit-Ivry, France

Application March 25, 1936, Serial No. 70,733
In France March 27, 1935

6 Claims. (Cl. 123—139)

This invention relates to the feeding of fuel to internal combustion engines and has particular reference to a novel method and apparatus for injecting fuel into the cylinders of engines automatically under the action of pressure therein.

The present invention may be employed to advantage in connection with various types of internal combustion engines, but may be used to particular advantage with engines which do not employ ignition systems. In engines of this type, wherein the fuel is ignited only by the heat of compression, it is especially desirable to provide an accurate regulation of the amount of fuel injected into the cylinders as well as the timing of the successive injections, so that the engine may be properly controlled while operating under changing conditions. Also, it is desirable in an engine of this type that the injecting operations take place rapidly and in such a manner as to permit complete and instantaneous combustion in order that the engine may operate efficiently.

The new method and apparatus ensure efficient operation and accurate control of the engine at all times by providing complete and rapid distribution of fuel in the cylinders in variable quantities and at variable points in the engine cycle which are determined automatically by the operating conditions of the engine. The apparatus of the invention is of a simple and durable construction and is provided with means for protecting the injector parts against the undesirable effects of combustion in the cylinder. The operation of the apparatus is effected by the pressure in the engine cylinder and accordingly the use of a separate fuel pumping mechanism with its attendant disadvantages is avoided.

According to the present invention, the fuel for the engine is admitted at intervals from a reservoir to a compression chamber in a fuel feeding device, one such device being provided for each cylinder of the engine. The feeding device comprises a housing in which the compression chamber is formed, and the housing is mounted in an opening formed in a wall of its corresponding engine cylinder. Fitted in the housing is a piston for compressing the fuel admitted to the chamber, the piston being operable in response to pressure changes in the engine cylinder to force the fuel from the chamber into the engine cylinder by way of a passage in the housing which leads to a nozzle normally extending into the cylinder. The nozzle is operatively connected with the piston so that when the latter is actuated to force the fuel in the chamber through the passage, the nozzle is given a linear movement in the engine cylinder. Preferably, the passage is formed in the piston, and an atomizer to which it leads is attached to one end of the piston which normally extends into the cylinder through an opening in the housing, whereby the atomizer and the end of the piston are drawn into the housing as the piston injects the fuel. A valve in the housing controls flow through the passage and is operable in response to pressure changes in the fuel compression chamber so that flow through the passage to the atomizer occurs when the fuel has been compressed to a certain pressure.

The piston in the housing is preferably of the differential type whereby pressure fluid in the engine cylinder may act directly on the piston through an opening in the engine cylinder and cause it to compress the fuel in the housing to a pressure exceeding that in the cylinder, thus affording the necessary pressure for injecting the fuel against the compression of the engine. The quantity of fuel injected is controlled by means which permit the escape of fuel from the housing during the compression stroke of the piston, the amount of fuel passing to the atomizer at each injection being regulated by a lever mounted on the housing and connected to the fuel escape means. Means are also provided for varying the response of the piston to pressure changes in the engine cylinder, so that the piston may be caused to compress and inject the fuel at various points in the engine cycle which are determined by the position of a second lever mounted on the housing. The two control levers may be connected to a governing mechanism whereby the quantity as well as the advance or retardation of the fuel injections may be regulated in accordance with the speed of the engine.

It will be apparent that the new method and apparatus afford complete distribution of the fuel throughout the interior of the engine cylinder, by reason of the linear movement given to the fuel discharge means during the injection. Upon completion of the injecting operation, the fuel discharge means are withdrawn in the housing so that when combustion occurs the parts thereof are protected against carbon deposits and other undesirable effects of combustion. After combustion has occurred, the piston and discharge means return to their original positions in response to the decrease in pressure in the engine cylinder and a new supply of fuel is admitted to the compression chamber in the housing, the device then being ready for the next injection.

The invention also includes various other novel features and advantages which will be referred to in the detailed description to follow. For a more complete understanding of the invention reference may be had to the accompanying drawings, in which Fig. 1 is a sectional view of one form of the new fuel feeding device showing the feeding parts at rest and set for minimum delivery and maximum retardation;

Fig. 3 is an enlarged section of the fuel compressing and distributing mechanism shown in Fig. 1;

Figures 4 and 5 show a side view and a plan view, respectively, of a split screw which serves to limit and to regulate the lift of the fuel valve with respect to the piston of the device;

Figures 6 and 7 show a plan view and a section along the line X—X, respectively, of the atomizer fitted on the end of the piston;

Figure 8 is a side view of an elastic closure for the atomizer.

Figure 9 shows an arrangement for the automatic regulation of fuel delivery to an internal combustion engine to provide for constant speed with a varying load; and Figures 10, 11 and 12 show three positions of a modified arrangement of control means for the fuel feeding device, which limits the speed of the engine.

Figure 1:
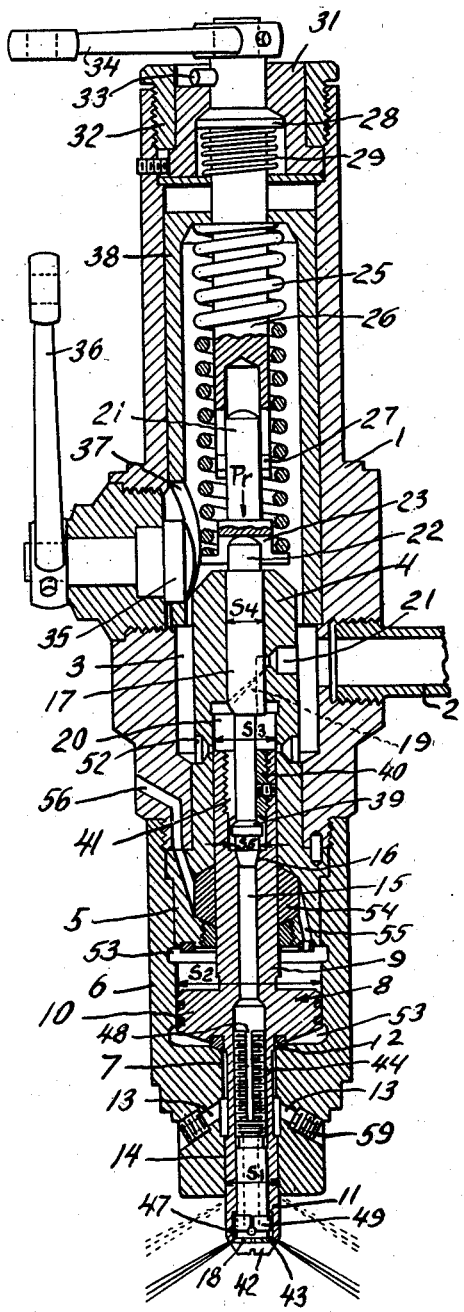

While the present invention will be described and illustrated in detail in connection with an internal combustion engine of the type that does not employ an ignition system, it will be understood that this application is not limited thereto and that it may be used to advantage with other types of internal combustion engines.

In the drawings the numeral 1 designates the upper section of a frame which is provided with a tube 2 for conducting fuel into a recess 3 of the housing forming a reservoir. The reservoir 3 is closed at the bottom by a differential pump cylinder 4 of sections $S_3$ and $S_4$, the cylinder being provided at its lower end with a collar 5 against which a lower section 6 of the housing is held by screw threaded engagement with the upper section 1 of the housing. The lower section 6 of the housing is formed with a bore of section $S_2$, and the bore terminates in an orifice 7 of section $S_1$ which communicates with the cylinder of the engine.

A hollow differential piston 8 is mounted in the lower section 6 of the housing and comprises an upper part 9 engaged in the bore $S_3$ of the pump cylinder 4, a median part 10 engaged in the bore $S_2$ of the housing and a lower part 11 extending into the working chamber of the engine through the orifice of section $S_1$ of the housing.

In the position of rest (Figures 1 and 3) the piston 10 closes on an annular plastic washer 12 at the upper end of the orifice 7 of section $S_1$, the latter being in communication with the compression chamber of the engine through lateral holes 13 and through the annular space 14 around the lower stem 11 of the piston 8. It will be understood that the annular space 14 between the housing 6 and stem 11 is of microscopic dimensions so as to permit only a small amount of gas to pass from the engine cylinder into the space below piston 8.

The central recess 15 of the piston 8 opens at its upper end into a conical seat cooperating with a valve 16 mounted at the lower end of a differential pin 17 of sections $S_4$ and $S_5$, while at the opposite end it is in communication with the working chamber of the engine through lateral orifices 18 for atomizing the fuel, the angular direction of the orifices being dependent upon the shape of the working chamber of the engine.

The differential pin 17 is provided with a slot having a helicoidal ramp or cam face 19 which, according to the angular position of the pin and the height of the piston 9 which is adapted to move the pin axially, can put the compression chamber 20 of the pump cylinder 4 into communication with a discharge orifice 21 discharging into the reservoir 3.

The differential pin 17 extends through the top of cylinder 4 and is formed at its upper end with a cylindro-conical head 22 provided with two cut faces engaged with corresponding inner faces 23 of a low inertia striker 24. The spring 25 engages the striker and causes it to urge the pin 17 on its conical seat 16 and consequently the piston 8 on the seat 12 of the lower housing member.

The striker 24 is moving axially in a bore of the shaft 26 controlling the feed. The angular position of this shaft determines that of the differential pin 17 through the intermediary of the striker 24 which is provided with a lug 27 engaged in a suitable guide of the shaft 26.

The shaft 26 carries a collar 28 which under the action of a spring 29 closes the upper part of reservoir 3 in the upper housing member 1 by forcing the collar against a conical seat formed in a sleeve 31. The sleeve 31 is itself held on a shoulder of the housing 1 by a bushing 32 threaded into the upper end of the housing and engaging a shoulder on the sleeve. Connected to the upper end of shaft 26 is a feed control lever 34, and the shaft 26 is provided with a lug 33 engaged in a slot of sleeve 31 for limiting the angular displacement of lever 34 to the two positions of maximum feed and zero feed.

Figure 2:
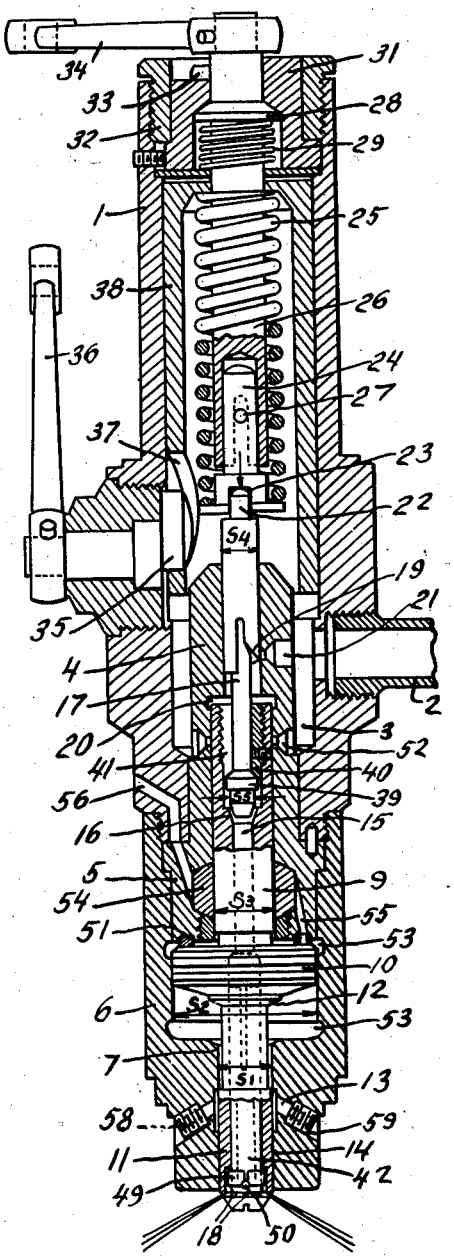
Fig. 2 is a similar view of the device shown in Fig. 1 with the feeding parts in their positions at the end of injection when set for maximum delivery and maximum advance.

An eccentric 35 controlled by a lever 36 operates on the lower lip of an opening 37 formed in a sleeve 38 which is guided in the bore of the frame 1 in such a way as to be movable between the two extreme positions shown in Figures 1 and 2. The spring 25 of the striker 24 is held under compression between the striker and the upper end of sleeve 38, and accordingly the force exerted by the spring will be a maximum in the position shown in Figure 1 and a minimum in the position shown in Figure 2.

The lift of the differential pin 17 with respect to the piston 8 is limited by a collar 39 which abuts during the injection on a conical seat of a bushing 40 screwed into the piston 9. The threaded bushing 40 (Figures 4 and 5) is split laterally by a slot 41 which permits passage of fuel from chamber 20 to the space surrounding valve 16, and accordingly when differential pin 17 is raised with respect to piston 8, the fuel in chamber 20 may pass into the bore 15 of the piston.

Mounted in the lower end of piston 8 is an atomizer 42 provided with a hollow stem 44 threaded into the enlarged lower portion of bore 15. The lower end of bore 15 is formed to provide an annular chamber 47 which opens into a conical seat 43 against which the head of the atomizer engages. The hollow stem 44 of the atomizer is provided with lateral openings 46 which permit passage of fuel from bore 15 to the chamber 47, and the head of the atomizer is slotted to form the orifices 18 which permit passage of fuel to the engine cylinder. By varying the number or cross section of the orifices 18 and their angle, the atomizer may be arranged to spray the fuel in any desired directions and quantities in the engine cylinder. In order to secure the atomizer 42 more firmly in the bore of piston 8, its threaded stem 44 is provided with a slot 48 parallel to the axis of its bore, so that whenever during injection the differential pin 17 raises to admit fuel to the bore 15, the pressure of the fuel expands both sides of the split stem 44 against the internal thread of the passage.

A split elastic ring 49 tightly closes the two fuel exit orifices 46 in the chamber 47 (Figure 8). At each injection the fuel under pressure raises the two lips of the ring 49 and passes into the chamber 47 and the orifices 18. When the injection is finished the elastic ring closes on the two holes 46. The pressure of the gas in the combustion chamber is then exerted on the external wall of the split ring ensuring a hermetic closure of the two orifices 46. A lug 50 on the atomizer 42 engages in a slot formed in ring 49 and holds the ring in a position symmetrical with respect to the two holes 46.

It will be observed that with this construction the atomizer 42 may be readily unscrewed from the lower end of piston 8 to permit cleaning of the atomizing orifices and the openings 46 in the stem. Also, the resilient ring 49 seals the bore 15 of the piston close to the mouths of the atomizing orifices 18, thereby preventing the atomizer from dripping and at the same time preventing the passage of fuel through the valve 16 if by accident the differential pin 17 should not settle snugly on its conical seat.

The injection is produced during the ascending stroke of the piston 8 in such a way that the fuel is distributed through the atomising orifices 18 through the whole volume of the working chamber of the engine (Figures 2 and 3). The atomised drops continuously come into contact with the combustion agent necessary for their oxidation, and a more rapid and more complete combustion thus results than if the atomisation were to take place from a fixed point as in the case of the usual injectors.

The operation of the apparatus is as follows:

Calling $P_r$ the push of the spring 25, which maintains the pin 17 on its seat 16 and consequently the piston 8 upon the seat of section $S_1$ of the housing, and calling $p_c$ the pressure in the engine cylinder at the end of compression, this pressure $p_c$ acting on the section $S_1$ of the piston 8 exerts a force $P_c = p_c.S_1$ in an opposite direction to the force $P_r$ of the spring 25. The strength of spring 25 is such that $$P_r \leqslant P_c$$

During engine compression there will thus be a point near the high dead centre at which the pressure exerted on the surface $S_1$ of the piston 8 will become equal to and then greater than $P_r$. At this moment the equilibrium being destroyed, the piston 8 leaves its seat while the force which urges it upwardly increases immediately from the value $p_c.S_1$ to the value $p_c.S_2$ which is many times greater. The piston 8 is then immediately forced against an impact abutment 51 of plastic material serving for the base of the collar 5 of the pump cylinder 4.

Simultaneously the part 9 of section $S_3$ of the piston closes inlet ports 52 leading to the chamber 20 of the pump cylinder and then compresses the fuel enclosed in the chamber 20 to a pressure $p_1$.

$$P_i = \frac{p_c.S_2 - P_r}{S_3 - S_5}$$

The sections $S_4$ and $S_5$ of the differential pin 17 are of such areas that $$P_r \leqslant p_i(S_4 - S_5)$$

Thus, the pin is lifted from its seat 16 and the fuel during the ascending stroke of the piston 8, traverses the recess 15 of the piston and passes to the atomizer 42 where it is atomised and distributed through the whole volume of the working chamber of the engine.

During the period of combustion and of a large part of the expansion of the gas, the end 11 of piston 8 is withdrawn in the port 14 in the lower end of the housing 6 (Figure 2). The atomiser is thus protected from the high temperatures of combustion, thereby preventing the formation of particles of tar and carbon in the chamber 47 which would close the atomizing orifices 18.

When the combustion gas in the engine cylinder has expanded to a value $p_d$ such that $$p_d.S_2 \leqslant P_r$$

the piston 8 will take up its first position (Figures 1 and 3) so that the inlet ports 52 are again opened to admit a fresh charge of fuel into the chamber 20 of the pump.

According to the position of the feed lever 34, which through the medium of the shaft 26 and the striker 24 determines the angular position of the ramp 19 of the pin with respect to the discharge orifice 21 of the pump chamber 20, the injection feed will be a maximum when the helicoidal ramp 19 does not meet the discharge orifice during the upward movement of the pin 17 (Figure 2) and will be zero when the ramp remains in constant communication with the discharge orifice (Figure 1).

When the lever 36 is in the position shown in Fig. 2, the force $p_r$ of spring 25 will be a minimum, since in this position the eccentric 35 permits sleeve 38 to occupy its uppermost position, thereby extending the confines of the spring. However, when lever 36 is in the position shown in Fig. 1, the eccentric 35 holds the sleeve in its lowest position and the force $p_r$ will be a maximum. In the latter position, the force $p_r$ exerted by spring 25 is approximately such that $$p_r = p_c.S_1$$

and accordingly the injections will occur at substantially the highest point in the compression part of the engine cycle, since below this point the pressure in the cylinder will not be sufficient to initially actuate piston 8 against the force of the spring. In order to advance the injections, the lever 36 is moved toward the position shown in Fig. 2, thereby diminishing the force $p_r$ of spring 25 so that $$p_r < p_c.S_1$$

When the force $p_r$ is thus reduced, piston 8 will be lifted from its seat and the injection will occur before the compression $p_c$ in the engine cylinder has reached its maximum value.

It will be understood that the adjustment of the timing of the injections results in a slight variation of the load exerted by spring 25 on the differential pin 17, and that accordingly the ratio of the sections $S_4$ and $S_5$ must be such as to permit the lifting of the pin under the action of the pressure $p_1$ when the force $P_r$ of the spring is a maximum. (Position of Figure 1)

$$P_r \max \leqslant p_i(S_4-S_5)$$

The pressure at which fuel in chamber 20 can raise differential pin 17 with its valve 16 and pass to the atomizer will increase slightly as the force $p_r$ of spring 25 is increased, as will be readily understood.

In order to avoid carbon deposit in the housing 6 and on the piston 10, especially in two cycle engines where scavenging is incomplete and the compressed air is charged with fumes, the bore $S_2$ of the gas cylinder is formed with two annular grooves 53 at the ends thereof. The carbon deposit is thus pushed by the piston 10 at each end of its stroke into one or the other of the grooves 53 where it has sufficient space for depositing without obstructing the movement of the piston.

It is desirable that fuel in compression chamber 20 be prevented from leaking along piston 9 to the cylinder $S_2$ in housing 6, since fuel leaking into cylinder $S_2$ would be brought to distilling temperature by the heat of the engine and cause deposits of tar and carbon which in time would score the mechanism. In order to prevent such leakage, a ring of packing 54 is arranged around piston 9 at the base of pump cylinder 4 so that any fuel leaking along the piston is absorbed by the packing. Passages 55 and 56 are provided in the collar 5 and housing member 1 to afford an outlet at the top of cylinder $S_2$, whereby the heated gases in the upper part of the latter will be forced through packing 54 during the upstroke of the piston and expel the fuel from the packing in the form of vapor.

In order to protect the housing 6 and the piston 10 from the high temperatures during the period of combustion, the stem 11 of the piston at the end of the injection closes the holes 13 and 7 of the housing, thereby interrupting direct communication with the working chamber of the engine (Figure 2) until the return of the piston to its lower position.

In order to allow for an appreciable difference in the expansions of the housing 6 and of the piston 10 due to heat, the latter may be provided with one or more elastic rings 57, as shown in Figure 3.

It will be observed that by varying the size of inlet openings 13, which admit fluid under pressure from the engine cylinder to bore $S_2$ of the housing, the speed at which pressure builds up in bore $S_2$ and hence the speed of the injections may be varied. Increasing the size of the inlet openings will cause the engine cylinder gases to pass more rapidly into bore $S_2$ when piston 8 is raised from its seat, so that portion 10 will be immediately driven against the impact abutment 51. Accordingly, the fuel in chamber 20 will be compressed and expelled rapidly into the engine cylinder and the combustion phase of the engine cycle will approach constant volume. On the other hand, decreasing the size of inlet openings 13 will result in a slower upward movement of piston 8 and slower injection, and accordingly the combustion phase of the engine cycle will approach constant pressure. In order to facilitate the adjustment of the speed of injection the inlet openings 13 are threaded to receive plugs 59 having inlet passages 58, the plugs 59 being interchangeable with other similar plugs having passages of different sizes.

A feeding device of the present invention when installed on an engine may be controlled in various ways by means of the control levers previously referred to. In cases where the engine speed is to be kept substantially constant under varying loads, an arrangement such as that shown in Fig. 9 may be used. The feeding devices shown in Fig. 9 are similar in all respects to that shown in Figs. 1 to 8, inclusive, except that the slope of the ramp 19 is reversed, whereby movement of lever 34 in a clockwise direction (from right to left in Fig. 9) serves to shut down the amount of the feed and movement of the lever 34 in a counterclockwise direction serves to increase the amount of the feed. As shown in Fig. 9, the levers 34 and 36 are connected to a rod 60 which is connected to and controlled by a governor 61 of the engine. When the engine is not in use, the levers 34 controlling the quantity of the injections are in the position M of maximum delivery, and levers 36 controlling the timing are in position R of maximum retardation. When the engine is running, the governor 61 acts on control levers 34 and 35 through rod 60 to increase the quantity and retard the timing of the injections whenever the speed decreases, and conversely to decrease the quantity and advance the timing whenever the speed increases. A lever 62, suitably pivoted at one end, is connected to rod 60, and in order to stop the engine the lever 62 is moved to the position O corresponding to the position of lever 34 in which no fuel is delivered to the engine.

In the event that the engine is to be used for a varying load and is not to operate above a certain maximum speed, the arrangement shown in Figs. 10, 11 and 12 may be employed. The feeding devices there shown are likewise similar in all respects to the device shown in Figs. 1 to 8, inclusive, except that the slope of the ramp 19 is reversed, so that movement of lever 34 in a clockwise direction shuts down the amount of feed and movement of the lever in a counterclockwise direction increases the amount of feed. The mechanism shown in Figs. 10, 11 and 12 comprises a rod 63 connected to the levers 34 for controlling the quantity of fuel injections. Movement of rod 63 is effected by an accelerator pedal 64 which is connected to one end of the rod through a spring guide 65, the latter permitting the control rod to move against the action of its spring in the direction for cutting down the fuel delivery regardless of the position of accelerator pedal 64. The other end of rod 63 is slidable freely in a guide 66 which is pivoted to the control lever of a governor 67 on the engine. The governor by determining the position of guide 66 permits rod 63 to move freely under the action of the accelerator 64 as long as the speed of the engine is at or below the maximum speed, which corresponds to the position B of the control lever of the governor (Figs. 10 and 11). When the engine is operating at maximum speed, the governor assumes position B where it holds sleeve 66 in fixed engagement with the end of shaft 63, so that movement of accelerator 64 beyond its position corresponding to maximum speed results only in compressing the spring in guide 65. If for any reason the engine speed exceeds the maximum, the governor approaches position $\gamma$ (Fig. 12) thereby forcing rod 63 towards its position of cut-off against the action of the spring in sleeve 65, regardless of the position of accelerator 64.

Preferably, the levers 36 are connected to a control rod 68 which in turn is connected to the control lever of governor 67 through a spring 69, whereby the timing of the fuel injections is regulated automatically in accordance with the speed of the engine.

While the apparatus of the present invention has been described in detail by reference to the accompanying drawings, it will be understood that the invention is not limited to the construction shown therein, but includes various modifications within its scope.

I claim:

1. A device for feeding fuel to internal combustion engines which comprises a housing having a chamber therein and a passage leading from the chamber to the exterior of the housing, means for admitting a predetermined quantity of fuel to said chamber, a piston movable in said chamber to force fuel under pressure through said passage, an exhaust port in a wall of the housing, a member including an exhaust passage movable in the housing by said piston to connect the chamber with said port, said member being normally held by the piston in position to close said port, and means for adjusting said member to vary the normal position of said exhaust passage with respect to the piston.

2. A device for feeding fuel to internal combustion engines, which comprises a housing having a chamber therein and a passage leading from the chamber to the exterior of the housing, said housing being formed with a cylindrical bore communicating with the chamber and having a lateral outlet opening, a cylindrical member mounted in said bore for rotary and longitudinal movement therein and having a helical recess in its cylindrical surface communicating with the chamber and adapted to overlie said outlet opening, said member being normally in position to close the outlet opening from said chamber, means for admitting a predetermined quantity of fuel to said chamber, a piston movable in the chamber to force fuel through said passage, means normally connecting said cylindrical member with the piston for moving the member longitudinally to position said recess over said outlet opening during the compression stroke of the piston, and means for rotating said member in the bore to vary the angular position of the recess with respect to said outlet opening.

3. A device for feeding fuel to internal combustion engines which comprises a housing having a chamber therein and a cylindrical bore communicating with said chamber and having a lateral exhaust port, a cylindrical member slidable in said bore and having a recess in its cylindrical surface communicating with said chamber and adapted to overlie said port, said member being normally in position to close the port from said chamber, means for admitting fuel to said chamber, a piston movable in the chamber to compress fuel therein and having an opening therethrough for passage of fuel to an engine cylinder, and a valve normally seated in said opening and operatively connected to said cylindrical member to control passage of fuel through the opening, said member being operable in response to a predetermined pressure in the chamber to open said valve.

4. A device for feeding fuel to internal combustion engines which comprises a housing having a chamber therein and a cylindrical bore communicating with said chamber, an outlet port in a wall of the housing communicating with said bore, a cylindrical member slidable in said bore and having a recess in its cylindrical surface communicating with said chamber and adapted to overlie said port, said member being normally in position to close the port from said chamber, means for admitting fuel to said chamber, a piston movable in the chamber to compress fuel therein and having an opening therethrough for passage of fuel to an engine cylinder, a valve normally seated in said opening and operatively connected to said cylindrical member, said member being operable in response to a predetermined pressure in the chamber to raise said valve from its seat, and means for limiting the upward movement of the valve from its seat.

5. In combination with an internal combustion engine, a device for feeding fuel to the engine which comprises a housing having a chamber therein and a cylindrical bore communicating with said chamber, an outlet port in a wall of the housing communicating with said bore, a cylindrical member mounted in said bore for longitudinal and rotational movement therein and having a helical recess in its cylindrical surface communicating with said chamber, said member extending through one end of the housing and being normally in position to close said port from the chamber, means for admitting a predetermined quantity of fuel to said chamber, a piston movable in the chamber to compress fuel therein and having an opening therethrough for passage of fuel to an engine cylinder, means operable by a predetermined pressure in said engine cylinder to move said piston inwardly in the chamber, a valve normally seated in said opening and operatively connected to said cylindrical member, said member being movable longitudinally by the inward movement of the piston in the chamber to position said recess over the outlet port and operable by a predetermined pressure in said chamber to open said valve, means engaging the outer end of said member for angular adjustment thereof to vary the angular position of said recess with respect to said port, and adjustable means normally urging said member inwardly in the housing for varying the response of said pressure operable means to pressure in said cylinder.

6. In combination with an internal combustion engine, a device for feeding fuel to the engine which comprises a housing, a differential piston in the housing, means for admitting fuel to the housing at one end of said piston, a passage for admission into the housing at the other end of the piston of pressure fluid from the engine cylinder, the housing having an outlet passage leading from the interior thereof and said one end of the piston for passage of fuel to said cylinder, said piston being operable by said pressure fluid to force fuel in the housing through said outlet passage, a valve normally closing said first passage, means operable by a predetermined pressure in said cylinder to open said valve, and means removably secured in said first passage for admitting pressure fluid from said cylinder at a predetermined rate upon opening of said valve.

JEAN EDOUARD TUSCHER.